(12) United States Patent
Meriac et al.

(10) Patent No.: US 11,494,256 B2
(45) Date of Patent: Nov. 8, 2022

(54) MEMORY SCANNING OPERATION IN RESPONSE TO COMMON MODE FAULT SIGNAL

(71) Applicant: Arm Limited, Cambridge (GB)

(72) Inventors: Milosch Meriac, Cambridge (GB); Emre Özer, Cambridge (GB); Xabier Iturbe, Cambridge (GB); Balaji Venu, Cambridge (GB); Shidhartha Das, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/261,217

(22) PCT Filed: Jun. 6, 2019

(86) PCT No.: PCT/GB2019/051570
§ 371 (c)(1),
(2) Date: Jan. 19, 2021

(87) PCT Pub. No.: WO2020/016550
PCT Pub. Date: Jan. 23, 2020

(65) Prior Publication Data
US 2021/0279124 A1     Sep. 9, 2021

(30) Foreign Application Priority Data
Jul. 19, 2018    (GB) ..................................... 1811795

(51) Int. Cl.
*G06F 11/00*    (2006.01)
*G06F 11/07*    (2006.01)
(Continued)

(52) U.S. Cl.
CPC ...... *G06F 11/0793* (2013.01); *G06F 11/0772* (2013.01); *G06F 11/165* (2013.01); *G06F 11/2043* (2013.01); *G06F 11/3037* (2013.01)

(58) Field of Classification Search
CPC ............. G06F 11/0793; G06F 11/0772; G06F 11/165; G06F 11/2043; G06F 11/3037
See application file for complete search history.

(56) References Cited

U.S. PATENT DOCUMENTS

2004/0199813 A1    10/2004    Hillman et al.
2006/0020850 A1    1/2006    Jardine et al.
(Continued)

FOREIGN PATENT DOCUMENTS

EP            0 201 356         11/1986

OTHER PUBLICATIONS

International Search Report and Written Opinion of the ISA for PCT/GB2019/051570 dated Aug. 23, 2019, 14 pages.
(Continued)

*Primary Examiner* — Christine T. Tu
(74) *Attorney, Agent, or Firm* — Nixon & Vanderhye P.C.

(57) ABSTRACT

An apparatus comprises a plurality of redundant processing units to perform data processing redundantly in lockstep; common mode fault detection circuitry to detect an event indicative of a potential common mode fault affecting each of the plurality of redundant processing units; a memory shared between the plurality of redundant processing units; and memory checking circuitry to perform a memory scanning operation to scan at least part of the memory for errors; in which the memory checking circuitry performs the memory scanning operation in response to a common mode fault signal generated by the common mode fault detection circuitry indicating that the event indicative of a potential common mode fault has been detected.

19 Claims, 4 Drawing Sheets

(51) Int. Cl.
    *G06F 11/16*           (2006.01)
    *G06F 11/20*           (2006.01)
    *G06F 11/30*           (2006.01)

(56) References Cited

U.S. PATENT DOCUMENTS

| | | |
|---|---|---|
| 2010/0268987 A1 | 10/2010 | Clark et al. |
| 2011/0173482 A1 | 7/2011 | Penton et al. |
| 2015/0178147 A1* | 6/2015 | Cordero .............. G06F 11/1048 |
| | | 714/703 |
| 2016/0283314 A1 | 9/2016 | Thanner et al. |
| 2019/0303260 A1* | 10/2019 | Ozer .................. G06F 11/2236 |
| 2019/0324751 A1* | 10/2019 | Boschi ................ G06F 11/1675 |

OTHER PUBLICATIONS

Combined Search and Examination Report for GB1811795.2 dated Dec. 18, 2018, 6 pages.
Office Action for GB Application No. 1811795.2 dated Mar. 5, 2021, 3 pages.

\* cited by examiner

MEMORY SCANNING OPERATION IN RESPONSE TO COMMON MODE FAULT SIGNAL

This application is the U.S. national phase of International Application No. PCT/GB2019/051570 filed Jun. 6, 2019 which designated the U.S. and claims priority to GB Patent Application No. 1811795.2 filed Jul. 19, 2018, the entire contents of each of which are hereby incorporated by reference.

The present technique relates to the field of data processing.

A data processing system may be vulnerable to certain randomly occurring faults which can lead to incorrect operation. For example, a single event upset may occur when a storage element of the data processing apparatus is hit by a cosmic ray or other particle, causing a stored bit of data to flip states which could lead to errors in processing. In some fields of application, it may be important that at least a certain percentage of such errors can be detected. Functional safety standards may define certain levels of functional safety which must be guaranteed in order to meet a certain level of functional safety classification. This can be particularly useful for applications which are safety-critical (e.g. in the automotive field) or for which a failure would cause huge economic losses (e.g. space missions).

One approach to achieving functional safety may be to provide two or more redundant processing units to perform data processing redundantly in lockstep. For example, a processor core of the apparatus may be duplicated or triplicated and substantially the same data processing may be performed on each of the redundant units. A comparator can compare outputs of the corresponding processing operations performed on each of the redundant units and detect an error if there is divergence between the outputs. This can be useful for detecting errors caused by signal event upsets in a storage element of one of the redundant processing units for example.

At least some examples provide an apparatus comprising: a plurality of redundant processing units to perform data processing redundantly in lockstep; common mode fault detection circuitry to detect an event indicative of a potential common mode fault affecting each of the plurality of redundant processing units; a memory shared between the plurality of redundant processing units; and memory checking circuitry to perform a memory scanning operation to scan at least part of the memory for errors; in which the memory checking circuitry is configured to perform the memory scanning operation in response to a common mode fault signal generated by the common mode fault detection circuitry indicating that said event indicative of a potential common mode fault has been detected.

At least some examples provide an apparatus comprising: a plurality of means for performing data processing redundantly in lockstep; means for detecting an event indicative of a potential common mode fault affecting each of the plurality of means for performing data processing; memory means for storing data, the memory means shared between the plurality of means for performing data processing; and means for memory checking, for performing a memory scanning operation to scan at least part of the memory means for errors; in which the means for memory checking is configured to perform the memory scanning operation in response to a common mode fault signal generated by the means for detecting indicating that said event indicative of a potential common mode fault has been detected.

At least some examples provide a data processing method comprising: performing data processing redundantly in lockstep using a plurality of redundant processing units; detecting an event indicative of a potential common mode fault affecting each of the plurality of redundant processing units; in response to detection of the event, generating a common mode fault signal; and in response to the common mode fault signal, triggering memory checking circuitry to perform a memory scanning operation to scan for errors at least part of a memory shared between the plurality of redundant processing units.

Further aspects, features and advantages of the present technique will be apparent from the following description of examples, which is to be read in conjunction with the accompanying drawings, in which:

While running multiple redundant processing units in lockstep can be effective at detecting single event upsets and other types of error which only affect one of the redundant processing units, the system may also be vulnerable to common mode faults which are types of fault which may affect each of the redundant processing units. For example, the processing units may share some signal lines, such as power, clock or reset lines, and so a glitch in the signal on one of these shared signal lines may be more likely to manifest as an error in all of the redundant processing units and so may not always be detectable from a comparison of the outputs. Functional safety standards, such as the automotive standard ISO 26262, may provide guidelines on proper management of common mode faults. For example, to address a common mode fault caused by voltage spikes or clock glitches, temporal diversity may be used to make one of the processing units run ahead of another of the redundant processing units by a certain number of cycles. By delaying the input to the second redundant processing units, the probability of a common mode fault related to a voltage supply or clock glitch causing output divergence between the redundant processing units may be increased, because the redundant processing units may be executing different computations at the time when the glitch occurs. Alternatively, a lockstep system could be equipped with circuit-glitch detectors which detect actual glitches on the shared lines. Hence in general, the system may have some common mode fault detection circuitry which may detect an event indicative of a potential common mode fault which affects each of the redundant processing units.

However, the inventors recognised that typically the system also includes a memory shared between the redundant processing units which may also potentially be affected by a common mode fault. For example the memory may be an on-chip memory which shares at least some of the same power, clock or reset lines as the redundant processing units themselves and so it is possible that a glitch on these lines could cause not only errors in the processing units, but also potential corruption of data stored in the shared memory. One approach could be to assume that any detected common mode fault could potentially affect the memory, and so take some recovery action each time a common mode fault is detected. However, in practice not all common mode faults may corrupt the data in memory, so triggering a recovery action for each common mode fault may unnecessarily result in the system being non-operational for a significant length of time. This is particularly significant for automotive systems, where it has been found that when an automotive vehicle is first switched on the surge of current from the battery may cause glitches on control lines which may detected as a common mode fault, and so triggering measures to recover from corrupted memory state on every time the vehicle is started may be undesirable.

The inventors recognised that in practice some events detected as common mode faults may not actually lead to corruption of data. Memory checking circuitry is provided to perform a memory scanning operation to scan at least part of the memory for errors. The memory checking circuitry may perform the memory scanning operation in response to a common mode fault signal generated by the common mode fault detection circuitry indicating that an event indicative of a potential common mode fault has been detected.

Hence, upon receiving a signal indicating that a potential common mode fault has been detected, the memory checking circuitry scans the memory to check for errors and determine whether the data in the memory is corrupted. The memory checking circuitry may then determine whether it is necessary to trigger any response action depending on the level of errors detected in the memory. Hence, this provides increased functional safety by avoiding the system continuing to process instructions or data that have been corrupted in the memory after a common mode fault, but restricts the performance cost of performing a recovery action to those cases where the data actually is determined in the scan to be corrupted.

In the memory scanning operation, the memory checking circuitry may generate an error map indicating which memory locations in at least part of the memory are erroneous memory locations detected to have encountered an error. The memory checking circuitry may determine, depending on a number or distribution of the erroneous memory locations indicated by the error map, whether to generate an error reporting signal for triggering an error handling response. This determination of whether to generate the error reporting signal may be performed in hardware, and so may not need software intervention. The error reporting signal may for example be an interrupt signal sent to the processing units to interrupt the current processing and trigger execution of an exception handling routine which may then determine what error handling response action should be performed such as a system reset or shutdown, erasing of the memory, or reloading the corrupted data from a backup data store.

The number or distribution of the erroneous memory locations may determine whether it is deemed necessary to generate the error reporting signal. It may often be expected that the impact of a common mode fault on a memory structure provided on the same voltage or clock domain as the processing units may affect a larger number of memory locations than errors caused by single event upsets which may only cause a single location to flip. Although single event upset errors could be accumulated over a period of time, so that there may be a number of memory locations which have each individually flipped at least one bit of state caused by a particle strike for example, the distribution of such erroneous memory locations caused by single event upsets may be expected to be relatively random, whereas a common mode fault could result in a more systematic pattern of errors where all of the locations in a certain region of the memory could be erroneous. Hence by analysing the number of erroneous memory locations and/or the distribution of those erroneous memory locations, the memory checking circuitry may determine whether to generate an error reporting signal. Relatively low levels of errors that could be attributed to a single event upset or multi-bit upset may not justify sending the error reporting signal, as such errors may be able to be handled by other means such as using an error correcting code.

The memory scanning operation can be implemented in different ways. In one example the memory scanning operation may be performed on the entire memory. Hence when a common mode fault signal is received, the memory checking circuitry may scan each memory location of the memory device to check for errors.

Alternatively, to limit the performance impact of the memory scanning operation the memory checking circuitry could perform the memory scanning operation on a limited portion of the memory. For example, while the memory may include a critical portion which stores safety-critical code or data whose corruption would compromise the safety of the system, there may also be other data stored in the memory for which errors may be able to be tolerated as the data or code stored in that part of the memory may be less safety-critical. Hence, in some cases the duration of the memory scanning operation could be reduced by only scanning the critical portion of the memory and omitting scanning of a less critical portion. The split of the memory into critical and less critical portions could be fixed (e.g. hardwired) or could be programmable based on programmable registers associated with the memory checking circuitry which define the address ranges to be regarded as critical or less critical.

Another approach may be that while the memory scanning operation is performed on both the critical portion and the less critical portion, the memory checking circuitry may perform the memory scanning operation on the critical portion of the memory first before then performing the memory scanning operation on a less critical portion of the memory. By prioritising the critical portion this can allow errors which could potentially affect safety-critical data to be detected earlier, to enable faster triggering of the appropriate response, while errors affecting less critical data may not be as important to detect quickly.

The memory checking circuitry may generate a separate critical portion error reporting signal and less critical portion error reporting signal corresponding to the critical and less critical portions of the memory respectively. Hence the critical portion error reporting signal is generated based on the number or distribution of erroneous memory locations in the critical portion, while the less critical portion error reporting signal is generated based on the number or distribution of erroneous memory locations in the less critical portion. By providing separate error reporting signals for the respective regions of the memory, this can allow software to make different decisions as to whether an error handling response is necessary, or to apply different forms of error handling response, based on whether the critical portion or less critical portion is corrupted. For example, when the critical portion becomes corrupted then a form of response action which is more invasive could be chosen, such as resetting the system, wiping the contents of the memory or switching to use of a backup memory or refetching data from a backing store, which may result in some performance impact while the system is recovering from the detected error. On the other hand, the software may determine that such drastic response action is not necessary if only the less critical portion is corrupted, and in this case the response action could be for example to scrub the memory to correct the corrupted data using error correcting codes for example, or to take no action whatsoever.

Another approach may be to provide usage tracking circuitry to track which blocks of memory locations of the memory are in use. For example, the usage tracking circuitry may maintain a number of flags, each flag corresponding to a corresponding block of memory locations and being set when the corresponding block of memory locations is used. Whether a block is in use may for example depend on whether a write to one of the memory locations in the block has occurred since the system was reset. The memory checking circuitry may perform the memory scanning operation on the blocks of memory locations indicated by the usage tracking circuitry as in use. Hence it is not necessary to scan the blocks of memory locations which are not in use. This reduces the time taken to perform the memory scanning operation, reducing the performance impact.

As well as triggering the memory scanning operation at the memory checking circuitry, the detection of the event indicative of a potential common mode fault may also trigger the redundant processing units to perform a fault response action. For example the fault response action could be rewinding processing to an earlier point of execution, for example by restoring previously captured architectural state and then resuming execution of instructions from the point represented by that architectural state.

In some systems, the resumption of processing by the redundant processing units after detection of the common mode fault event by the common mode fault detection circuitry could be deferred until after the memory scanning operation has been completed. However, this could result in a relatively lengthy period of inactivity in the processing units, which may be a problem for certain safety/critical systems which may need to act in real time.

Hence, in some examples the redundant processing units may resume processing after detection of the event by the common mode fault detection circuitry, prior to completion of the memory scanning operation by the memory checking circuitry. For example, in systems where the critical portion of the memory is scanned before the less critical portion of the memory, the redundant processing units may resume their processing once the critical portion of the memory has been checked and need not wait for completion of the memory scanning operation on the less critical portion of the memory. The scanning of the less critical portion may then continue in the background of the normal processing.

Another approach can be that the redundant processing units may resume their processing before the memory scanning operation is complete, but then if one of the redundant processing units requests a memory access to a target block of memory locations which is still to be checked in a remaining part of the memory scanning operation, then the memory checking circuitry may stall the memory access until the target block of memory locations has been checked for errors. For example, the memory checking circuitry may maintain a progress indication indicative of which blocks of memory locations have already been checked for errors in the memory scanning operation. In some examples this could for example be a series of flags each corresponding to one of the blocks which indicates whether that block has been checked. However a less expensive means of tracking the progress of the memory scanning operation may be to use a watermark pointer which represents the boundary between the checked portion of the memory and the still to be checked portion of the memory. The watermark pointer could be updated as more locations are checked and then if there is a data access to a memory location within the checked region indicated by the watermark pointer then the memory access may proceed, while an access to the remaining portion which lies beyond the watermark pointer could be stalled. Hence, by permitting ongoing processing even if the memory scanning operation is not complete, this can improve performance by reducing the period when the redundant processing units are out of action following a detected common mode fault.

In this last approach using the progress indication, in some cases the progress indication could be applied to the entire memory. In other examples, the progress indication may be used within the critical portion of the memory only, and memory accesses may be allowed to access the less critical portion regardless of the progress of the scanning (as errors in those stored values may be less critical to safety).

The common mode fault detection circuitry may be implemented in different ways. In one example the common mode fault detection circuitry may comprise at least one anomaly detection circuit associated with a common signal line shared between the plurality of redundant processing units and the memory. The event detected by the common mode fault detection circuitry may be an anomaly in a signal on the common signal line detected by the at least one anomaly detection circuit. For example, the anomaly could be a glitch in the signal level (voltage) of the signal on the common signal line, for example a temporary increase or decrease of the voltage on the signal line relative to its expected value. The anomaly could also be a variation in the timing of transitions in the signal on the common signal line, for example a late or early transition of a clock signal or reset signal for example.

Another approach may be that the redundant processing units may operate with a time delay between a given processing operation performed on one of the redundant processing units and a given processing operation performed on another of the redundant processing units. In this case, the common mode fault detection circuitry may comprise comparison circuitry to detect the common mode fault event when a divergence in processing results generated by the redundant processing units is detected. In some cases, although divergence in processing outputs of time-offset redundant processing units could be caused by a single event upset or multi-bit upset effecting a single storage location rather than a common mode fault, some systems may as a precaution simply assume that any divergence in processing results of the time-offset redundant processing units could be a potential common mode fault and so may then generate the common mode fault detection signal to trigger the memory checking circuitry to perform the memory scanning operation.

However, in other systems the comparison circuitry may detect properties of the divergence in processing results to determine whether the divergence is likely to indicate a common mode fault. For example, a single bit difference between the outputs of the primary and redundant processing units, or a single error in the execution of an individual instruction, could be more likely to be caused by a single event upset. On the other hand a common mode fault may be expected to cause more divergence between the processing results because the common mode faults may have corrupted a larger number of storage elements such as registers which may affect architectural state to the extent that the operations of the respective redundant processing units differ significantly. Hence, in some cases the common mode fault detection circuitry could check whether the divergence is more than a certain threshold amount and if so may generate the common mode fault signal.

Of course, some systems may combine these approaches and may detect common mode faults both using comparison circuitry which compares outputs of the redundant processing units and using circuit-based anomaly detectors provided on common signal lines.

The memory may provide error detecting codes associated with stored data values in the memory which enable an error in the stored data value to be detected, and in some cases optionally also corrected. Hence the memory scanning operation may comprise comparing, for a given memory location to be checked for errors, a stored error detecting code associated with a given memory location with a calculated error detecting code calculated based on the data value stored in a given memory location. The stored error detecting code could be stored alongside the data value in the same memory as the data itself, or could be stored in a separate data storage unit (providing separation between the main memory storage and the error detection code storage can reduce the chance of a common mode fault affecting both the data and the related error detecting code). Hence, when data is written to memory the corresponding error detecting code can be calculated and stored in the associated location as the stored error detecting code, so that when the data is later accessed or scanned for errors in the memory scanning operation the stored error detecting code can be compared with a newly calculated error detecting code which is calculated using the same function as the stored error detecting code, but based on the data value now read from the memory location rather than the data written to the memory at the time the data was stored. Hence if the data has changed since it was written to the memory then this can be detected.

A range of types of error detecting code may be used. The term "error detecting code" is used herein to include not only types of code which enable an erroneous data value to be detected, but also error correcting codes which also enable at least some forms of error to be corrected based on the stored data value and redundant information included in the error correcting code. While error detecting codes which only allow detection of errors but do not allow the data to be corrected can still be enough to guarantee functional safety by enabling errors to be detected before they cause incorrect processing using corrupted data, the use of error correcting codes can allow the system to recover from the corruption of data more quickly.

Examples of error detecting codes may include parity codes, check sums or cyclic redundancy check (CRC) codes. Examples of error correcting codes include for example convolutional codes or block codes. In some cases the error detecting code could be a single error correcting, double error detecting (SECDED) code which is capable of detecting multi-bit errors where two or more bits of a stored data value flip states, but which can only correct the error if a single bit of the stored data value has flipped states since the data was written to the memory. Other forms of error correcting codes may be double error correcting, double error detecting (DECDED) which can also correct the multi-bit errors. Hence, it will be appreciated that any known type of error detection/correction code may be used for the error detecting codes. When a common mode fault event is detected then the memory scanning operation may scan the memory to check the error detecting codes for at least a portion of the memory to determine whether any data values have been corrupted.

The technique discussed above can be applied to any memory shared between the redundant processing units which could potentially be vulnerable to common mode faults which also affect the redundant processing units. Hence in general this may be a on-chip memory which is implemented in the same voltage and/or clock and/or reset domain used as the redundant processing units themselves. For example the memory may be a cache, scratchpad memory, or system memory. The memory could be an SRAM (static random access memory) or could be implemented using embedded DRAM (eDRAM), DRAM (dynamic random access memory), non-volatile RAM (NVRAM) or other forms of memory technology.

Figure 1:
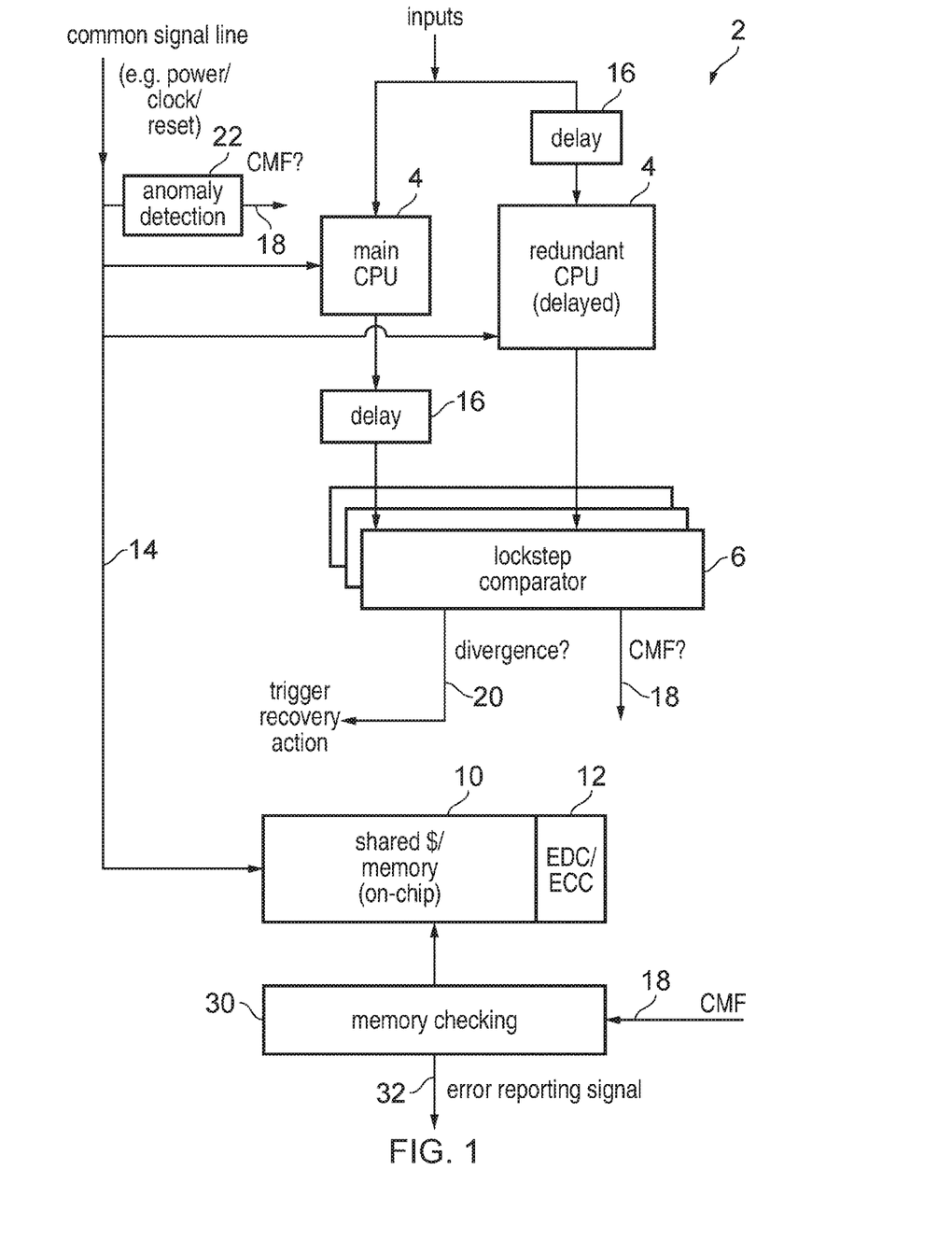
FIG. 1 schematically illustrates an example of an apparatus having a number of redundant processing units and memory checking circuitry to perform a memory scanning operation on a memory.

FIG. 1 schematically illustrates an example of a data processing system 2 having a number of redundant processing units 4 (e.g. a main CPU and redundant CPU) for performing the same processing workload redundantly in lockstep. A lockstep comparator 6 is provided to compare the outputs of the redundant processing units 4 to detect divergence in the outputs, which may be an indication that an error has occurred, e.g. triggered by a single event upset or particle strike. While in FIG. 1 there are two redundant processing units 4, a main CPU and a redundant CPU, in other examples the CPU could be triplicated and each of the three redundant units may perform substantially the same processing. With a triple core lockstep system, majority voting could be used by the lockstep comparator 6 to select, as the correct processing output, the output provided by the majority of the three processing units. While a dual core lockstep system as shown in FIG. 1 can be sufficient to detect errors and trigger an appropriate recovery action if an error affects the output of one of the processing units 4, the recovery action may require processing to be rewound to an earlier point of execution and the affected instructions to be re-executed. In contrast, with a triple core lockstep system faster forward progress following the detected error is possible, since the outputs of the majority of the cores may be assumed to be correct and then only the erroneous core which had a different output to the other two cores could be reset and processing may continue making forward progress without any need to rewind the execution of the other two cores to an earlier point. Whether a dual core or triple core lockstep system is used may be a trade off between performance and the circuit area overhead of providing the additional core. The lockstep comparator 6 may itself be implemented using redundancy, e.g. by triplicating the comparison logic and using majority voting to determine the correct output of the comparison logic 6, to guard against potential errors which may occur in storage elements or signal paths of the lockstep comparator 6 itself.

Each of the redundant processing units 4 shares access to a shared memory 10, which may for example be a cache, scratchpad memory, or system memory, or any SRAM-based data structure or eDRAM/NVRAM shared by the redundant processing units, such as a translation lookaside buffer for example. The data stored in the shared memory 10 is associated with corresponding error detecting codes (EDC) or error correcting codes (ECC) 12 which may be stored within the same shared memory 10 or within a separate data structure. These codes can allow errors which arise in a stored data value after it has been written to the memory to be detected from a difference between the stored EDC or ECC that was generated at the time of writing the data to the memory based on the originally written value and a calculated EDC or ECC which is calculated from the value stored in the memory of the later sign. For conciseness, references to error detecting codes and error correcting codes are both made using the term error detecting code or EDC below, but it will be appreciated that the EDCs could also be ECCs.

As shown in FIG. 1, the redundant processing units 4 and the shared memory 10 may share a common signal line 14, such as a power line which supplies a power supply voltage for powering the redundant units, a clock line for supplying a clock signal for controlling timings of operations at the redundant units 4 or the memory 10, and/or a reset line for providing a reset signal which triggers resetting of the processing units 4 or the memory to some known default state. While only a single common signal line 14 is shown in FIG. 1, in practice there may be multiple such common signal lines. A glitch on the shared common signal line 14 may affect the operation of each of the redundant processing units 4 and so may not always be detectable from the divergence in outputs by the lockstep comparator 6.

One way to increase the robustness against common mode faults may be to delay the input to one of the redundant CPUs 4 and delay the outputs of the other CPU 4, by introducing delay buffers 16 as shown in FIG. 1, so that the common mode fault affects different computations in the main and redundant CPUs so as to increase the likelihood that a divergence in results of the same computation on each of the redundant units can be detected by the lockstep comparator 6. Hence, in systems using a time offset between the redundant units the lockstep comparator 6 may also function as a common mode fault detector which may generate a common mode fault signal 18 when such a common mode fault is detected. In some cases the lockstep comparator 6 may be able to distinguish single event upset errors which affect only a single storage element from common mode faults, because typically a common mode fault may result in wider divergence between the processing outputs of the cores. In other approaches, the single event upset signal 20 and common mode fault signal 18 may be combined and any divergence between processing outputs may be treated as an event which could potentially indicate that a common mode fault affecting each of the redundant cores has been detected.

Alternatively, common mode faults could be detected by providing anomaly detection circuitry 22 on the common signal line 14. The anomaly detection circuitry may include circuit elements designed to check for voltage spikes or voltage drops on the common signal line 14 or for late or early arriving signal transitions on the common signal line, where such glitches may result in a common mode failure across the different redundant units 4.

The shared memory 10 is an on-chip memory, such as a cache, tightly coupled memory, scratchpad memory, or main memory, which may be implemented in the same power, clock or reset domain as the redundant processing units for themselves and so may share the common signal line 14. Hence, a common mode fault which affects the redundant units 4 could also affect the memory 10 and could result in corruption of the data stored in the memory completely or partially. However, sometime the common mode fault may affect the data in the memory. A cautious approach could be to assume that any common mode fault could have corrupted the data and hence to wipe out data in the shared memory 10. However, this may severely effect performance as there may be a significant waiting time while the data is brought back into the memory from backup storage off-chip.

Instead, the memory checking circuitry 30 is provided for checking whether the contents of the shared memory 10 are corrupted or not, upon receiving the common mode fault signal 18 from the common mode fault detection circuitry 6, 22 which indicates that an event signaling a possible common mode fault has been detected in the system. Upon receiving the common mode fault signal 18, the memory checking circuitry 30 performs a memory scanning operation to check the EDCs 12 associated with the stored data in the memory 10 to identify whether there are any errors, and if so, which locations are erroneous. Based on the number and/or distribution of errors detected, the memory checking circuitry 30 makes a decision as to whether the memory is sufficiently corrupted to warrant signaling an error reporting signal 32 (e.g. an interrupt) which may trigger software to take more drastic action such as clearing of the data from the shared memory 10. The end decision on how to respond to the error reporting signal 32 may lie with software which is interrupted using the error reporting signal, however the analysis of the number and distribution of the errors in the memory to determine whether to trigger the error reporting signal may be performed in hardware by the memory checking circuitry 30. Hence, if the memory checking circuitry 30 detects that the data in the SRAM resources of shared memory 10 are still intact or only partially corrupted so as to not compromise the safety of the system, then the data in the memory 10 does not need to be erased and this can improve performance.

The memory scanning operation may check the error detecting or error correcting codes associated with stored data to determine whether any memory locations are erroneous. It is not necessary for the memory scanning operation to actually correct any errors in systems where error correcting codes are used. This avoids needing to incur additional processing time in performing writes to each erroneous location. For the purpose of determining how to handle the common mode fault it may be sufficient just to detect errors but not to correct them. This can reduce the time taken to perform a memory scan operation. Alternatively, in other implementations the detected errors could also be corrected if possible using error correcting codes, although this is optional.

Figure 2:
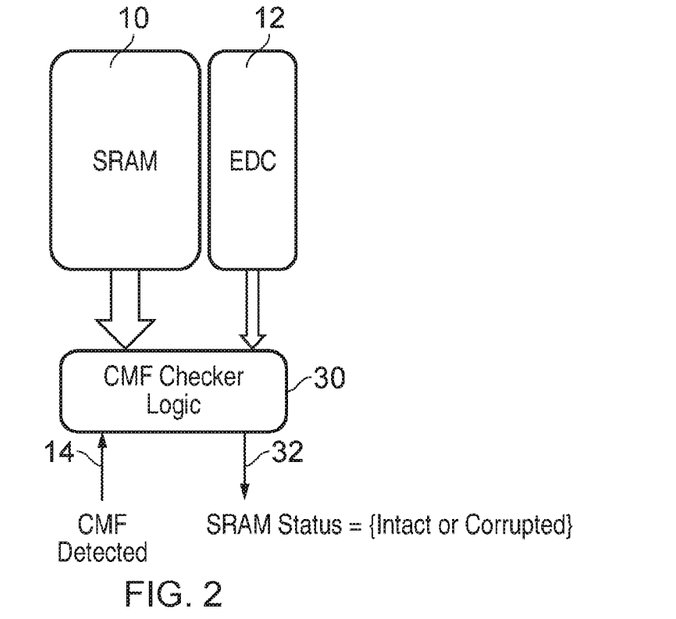
FIG. 2 shows a first example of memory checking circuitry for following memory scanning on a memory in response to a common mode fault detection signal.

FIGS. 2 to 5 show a number of examples for implementing the memory scanning operation. In the example of FIG. 2, the entire memory 10 is scanned by reading each memory line along with its EDC 12 to create an error map of the entire memory 10. Note that this may be different from memory scrubbing (where memory scrubbing hardware may read each memory line and correct the error if any error is detected—the memory scanning does not require correction of errors). If the error map indicates a (suspiciously or randomly) large number of errors, it is likely that a common mode fault (CMF), related to a random or deliberate glitch event, caused these errors rather than a single event upset or multi-bit upset caused by a particle strike, and in this case the CMF checker logic 30 sends an error reporting signal 32 to the system indicating that the memory contents are corrupted. If the error map indicates no errors or a very small number of errors that can be attributed to a single event upset or multi-bit upset, then the CMF checker logic sends a signal to the system indicating that the SRAM is not corrupted by the CMF (e.g. the interrupt line corresponding to the error reporting signal may be deasserted).

Figure 3:
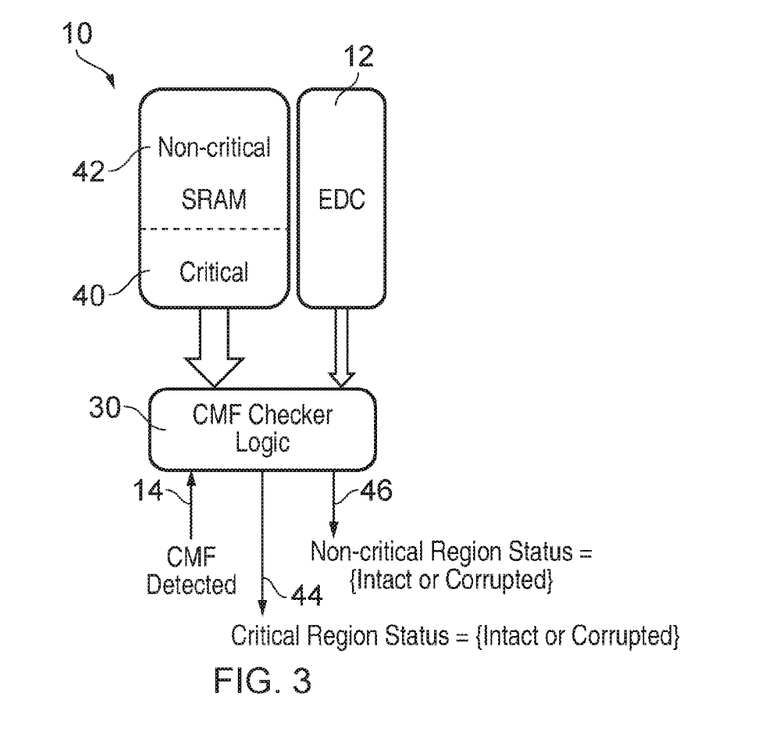
FIG. 3 shows a second example where the memory checking returns separate error reporting signals for critical and non-critical regions of the memory.

FIG. 3 shows a second example in which the memory 10 can be divided into a critical region 40 and non-critical region 42. The location and size of each region 40, 42 could be permanently fixed or hardwired, or could be determined at run time (e.g. based on region defining data stored in registers of the checker logic 30 which may be programmable by software). The critical region 40 contains the safety-critical code/data that are crucial for the safety-critical system to operate in a functionally safe manner. The non-critical region 42 may store other code or data for which errors can be tolerated without compromising the functional safety of the system. The CMF checker 30 checks both regions separately for errors (similar to FIG. 3, but with two separate error reporting signals 44, 46 for the critical and non-critical regions 40, 42 respectively) and reports their status to the system. The software can determine whether the system should continue to use the memory 10 if the critical region 40 is not corrupted but the non-critical region 42 is corrupted.

In other examples, the scanning of the non-critical region 42 could be omitted entirely, with only the critical region 40 being scanned for errors in response to the CMF detection signal 14.

Figure 4:
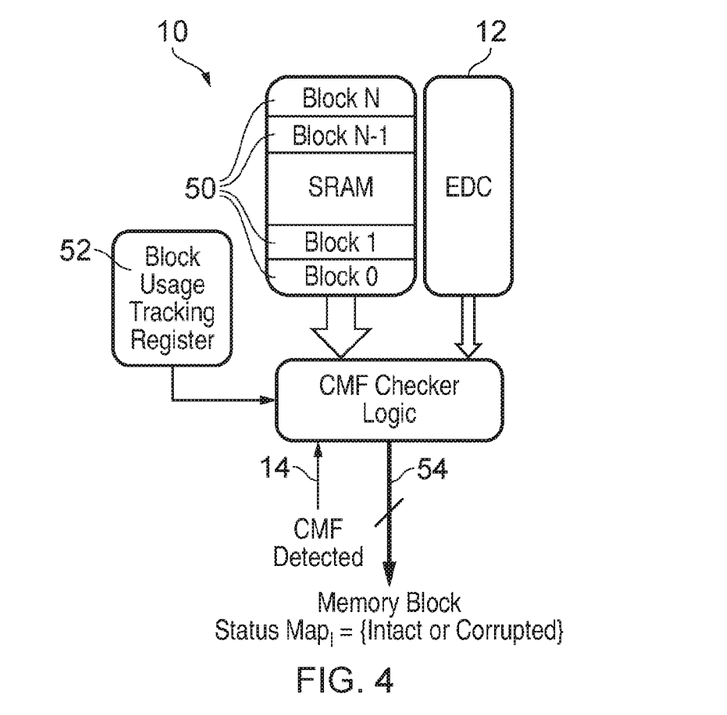
FIG. 4 shows an example where usage of memory blocks is tracked and the memory scanning operation is applied to the in-use blocks.

FIG. 4 shows another example in which the memory 10 is divided into blocks 50. The usage of the blocks is tracked in another hardware structure called Block Usage Tracking Logic 52, which has a register comprising one bit per block. Initially (at reset of the system), the register contains all zeros. If a block 50 is used (written to), its associated bit is set to 1 to mark the block as used. When the CMF detected signal 14 is received, the CMF Checker Logic checks the register, scans only the in use memory blocks 50 for errors, and sends their status to the system, e.g. by reporting the error status map 54 which indicates the locations of any in use blocks which are erroneous, or by simply returning an error reporting signal indicating whether the memory 10 as a whole is corrupted as in the previous examples of FIGS. 2 and 3. By only scanning the used blocks 50 of memory for errors, this reduces the performance impact of performing the memory scanning operation.

Figure 5:
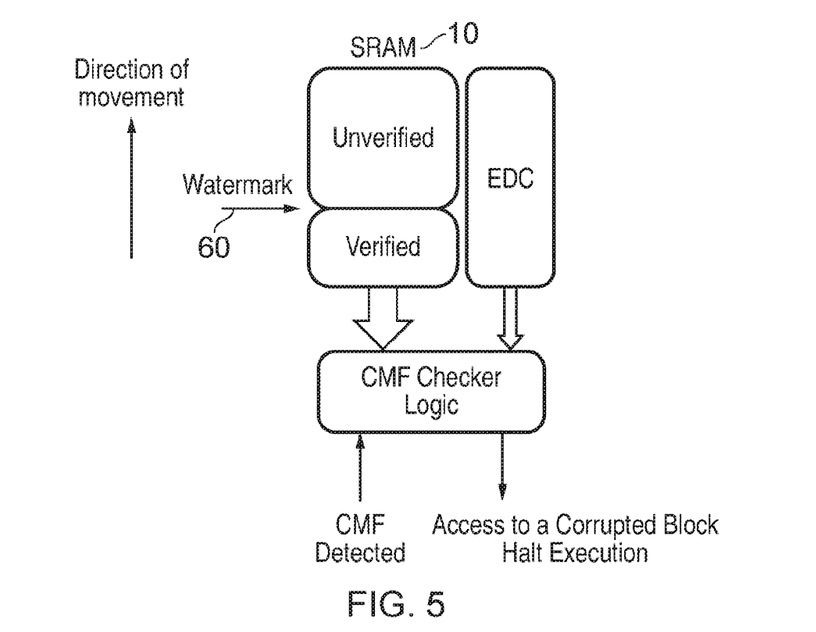
FIG. 5 shows an example where the progress of the memory scanning operation is tracked, and memory accesses by the redundant processing units to already checked memory locations can proceed before the memory scanning operation is complete.

FIG. 5 shows another example configuration, in which the memory 10 is divided using a watermark pointer 60 which tracks the progress of the memory scan operation (it will be appreciated other forms of progress indication could also be used, e.g. a bitfield indicating the already scanned locations). As the memory is scanned for errors (with optional correction of these errors in the progress), the watermark pointer is updated to indicate the parts of memory that have been verified already. If the memory is divided into critical and non-critical regions 40, 42 as in FIG. 3, then the critical region 40 is scanned before the non-critical region 42. The program execution can start (or resume after any recovery action performed in response to the CMF at the redundant processing units 10, 20) while the memory checking logic 30 is still scanning the memory. When data beyond the watermark pointer 60 which has not yet been checked for errors is referenced by the processing units 4, then the processing is stalled until the watermark moves past the location in question, allowing the processing unit 4 to fetch the required code or data and continue processing. Unless an Interrupt is referenced that uses data or code below the watermark or the watermark moves past the required code/data, the execution keeps stalled. Hence, with this approach performance can be improved by enabling the processing to continue with already checked data from the memory 10 even though scanning of other memory locations is still ongoing.

The examples above show cases where a memory scanning operation is performed in response to the common mode fault event being detected by the lockstep comparator 6 or anomaly detector 18. However, in addition, the memory could also be periodically or continuously scanned or scrubbed in the background of the normal processing, even in the absence of a common mode fault. A broken memory block can be repaired in the background without stalling the execution if it has correctable errors. The execution is only stalled when the memory blocks that have uncorrectable errors are accessed, after which a signal will be sent to the system to halt the program execution. However, by including a specific memory scan in response to the detection of the common mode fault, which may be more likely to result in significant corruption of the data, this can improve functional safety in lockstep based systems with access to shared on-chip memory 10 in the same voltage/clock/reset domain as the lockstep processing units 4.

Figure 6:
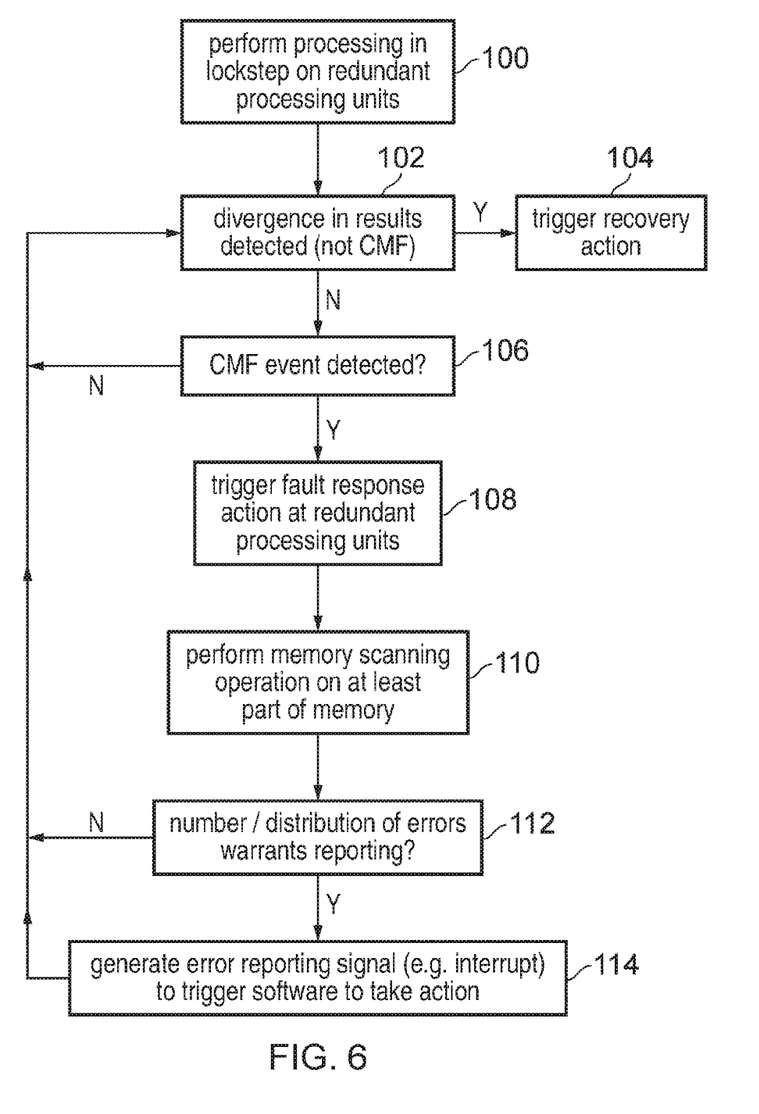
FIG. 6 is a flow diagram illustrating a method of performing error checking for a lockstep system.

FIG. 6 is a flow diagram illustrating a method of performing data processing in a lockstep system. At step 100, processing is performed in lockstep on the redundant processing units 4. Hence the same inputs are supplied to each of the processing units which each perform the same computations. Optionally there may be a time offset between the processing performed on one of the units and the corresponding processing performed on another. At step 102 the lockstep comparator 6 compares the results of corresponding operations on the respective redundant units to detect whether there is any divergence. If a divergence is detected which is not indicative of a potential common mode fault, then at step 104 a recovery action is triggered for handling the single event error. For example in a dual core lockstep system, previous architectural state may be restored to each of the redundant processing units 4 and processing may be resumed from the earlier point of execution represented by that architectural state. A series of state checkpoints may be maintained at time intervals to allow the restoration of earlier state. Alternatively, in a triple core lock step system the recovery action could be resetting the core whose output was found to be different to the other two cores based on the correct architectural state obtained from the two cores which did produce the same output, and processing may then continue without rewinding to an earlier moment of execution.

On the other hand, if at step 106 a common mode fault is detected, then the method proceeds to step 108. If no common mode fault is detected then the method returns to step 102 to continue checking for either single errors or common mode faults. The common mode faults at step 106 could be detected by the lockstep comparator 6 when a larger divergence in outputs is detected (e.g. a greater number of instructions for which the output of the respective units 4 was different), or could be detected by circuit based anomaly detection units 22 which analyse the signal on the common signal line 14 for glitches in voltage or late/early signal transitions. In some cases, other forms of anomaly detection circuit could also be provided for detecting events which could potentially represent a malicious attack on the integrated circuit, such as unusually high levels of radiation or temperature.

If a common mode fault event is detected then at step 108 a fault response action is triggered at the redundant processing units to recover from the potential common mode fault. For example, the same state restoration mechanism that is used for handling single event upsets could be used to handle common mode faults. Alternatively a more drastic response action such as triggering a reset of the system could be used in the event of a common mode fault.

Also, in response to the common mode fault event being detected at step 106, at step 110 the memory checking circuitry 30 performs the memory scanning operation on at least part of the shared memory 10, to check which memory locations have been corrupted. At step 112 the memory checking circuitry checks whether the number and/or distribution of the errors warrants reporting to the software and if not then no action is taken. If the number of errors is relatively low (e.g. representative of a number of single event upset errors having been accumulated over time) then there may be no need for a more drastic response action as such errors may be able to be corrected as and when they are accessed. On the other hand, if there is a significantly large number of errors or the distribution indicates some more systematic cause of error by a common mode fault, then at step 114 the memory checking circuitry 30 may generate the error reporting signal 32 (e.g. an interrupt) to trigger software to take a response action such as wiping the contents of the memory fetching in the corresponding data from a backing store. In the event of wiping the memory then it may also be necessary to reset the processor units 4 as well.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a plurality of redundant processing units to perform data processing redundantly in lockstep;
common mode fault detection circuitry to detect an event indicative of a potential common mode fault affecting each of the plurality of redundant processing units;
a memory shared between the plurality of redundant processing units; and
memory checking circuitry to perform a memory scanning operation to scan at least part of the memory for errors; in which
the memory checking circuitry is configured to perform the memory scanning operation in response to a common mode fault signal generated by the common mode fault detection circuitry indicating that said event indicative of a potential common mode fault has been detected.

2. The apparatus according to claim 1, in which in the memory scanning operation, the memory checking circuitry is configured to generate an error map indicative of which memory locations in at least part of the memory are erroneous memory locations.

3. The apparatus according to claim 2, in which the memory checking circuitry is configured to determine, depending on a number or distribution of the erroneous memory locations indicated by the error map, whether to generate an error reporting signal for triggering an error handling response.

4. The apparatus according to claim 1, in which the memory checking circuitry is configured to perform the memory scanning operation on:
the entire memory, or
a limited portion of the memory.

5. The apparatus according to claim 1, in which the memory checking circuitry is configured to perform the memory scanning operation on a critical portion of the memory before performing the memory scanning operation on a less critical portion of the memory.

6. The apparatus according to claim 1, in which the memory checking circuitry is configured to generate:
a critical portion error reporting signal corresponding to the critical portion of the memory; and
a less critical portion error reporting signal corresponding to the less critical portion of the memory.

7. The apparatus according to claim 1, comprising usage tracking circuitry to track which blocks of memory locations of the memory are in use; and
the memory checking circuitry is configured to perform the memory scanning operation on the blocks of memory locations indicated by the usage tracking circuitry as in use.

8. The apparatus according to claim 1, in which in response to detection of the event, the common mode fault detection circuitry is configured to trigger the redundant processing units to perform a fault response action.

9. The apparatus according to claim 1, in which the redundant processing units are configured to resume processing after detection of the event by the common mode fault detection circuitry, prior to completion of the memory scanning operation by the memory checking circuitry.

10. The apparatus according to claim 9, in which in response to one of the redundant processing units requesting a memory access to a target block of memory locations which is still to be checked in a remaining part of the memory scanning operation, the memory checking circuitry is configured to stall the memory access until the target block of memory locations has been checked for errors.

11. The apparatus according to claim 10, in which the memory checking circuitry is configured to maintain a progress indication indicative of which blocks of memory locations have already been checked for errors in the memory scanning operation.

12. The apparatus according to claim 1, in which the common mode fault detection circuitry comprises at least one anomaly detection circuit associated with a common signal line shared between the plurality of redundant processing units and the memory, said event comprising an anomaly in a signal on the common signal line detected by the at least one anomaly detection circuit.

13. The apparatus according to claim 1, in which the plurality of redundant processing units are configured to operate with a time delay between a given processing operation performed on one of the redundant processing units and said given processing operation performed on another of the redundant processing units; and
the common mode fault detection circuitry comprises comparison circuitry to detect said event when a divergence in processing results generated by the redundant processing units is detected.

14. The apparatus according to claim 1, in which the memory scanning operation comprises comparing, for a given memory location to be checked for errors, a stored error detecting code associated with the given memory location with a calculated error detecting code calculated based on a data value stored in the given memory location.

15. The apparatus according to claim 1, in which the memory comprises a cache.

16. The apparatus according to claim 1, in which the memory comprises scratchpad memory.

17. The apparatus according to claim 1, in which the memory comprises system memory.

18. An apparatus comprising:
- a plurality of means for performing data processing redundantly in lockstep;
- means for detecting an event indicative of a potential common mode fault affecting each of the plurality of means for performing data processing;
- memory means for storing data, the memory means shared between the plurality of means for performing data processing; and
- means for memory checking, for performing a memory scanning operation to scan at least part of the memory means for errors; in which the means for memory checking is configured to perform the memory scanning operation in response to a common mode fault signal generated by the means for detecting indicating that said event indicative of a potential common mode fault has been detected.

19. A data processing method comprising:

performing data processing redundantly in lockstep using a plurality of redundant processing units;

detecting an event indicative of a potential common mode fault affecting each of the plurality of redundant processing units;

in response to detection of the event, generating a common mode fault signal; and in response to the common mode fault signal, triggering memory checking circuitry to perform a memory scanning operation to scan for errors at least part of a memory shared between the plurality of redundant processing units.

* * * * *